1407X
Olds & Upham,
Reciprocating Saw Mill.
Patented Dec. 26, 1810.
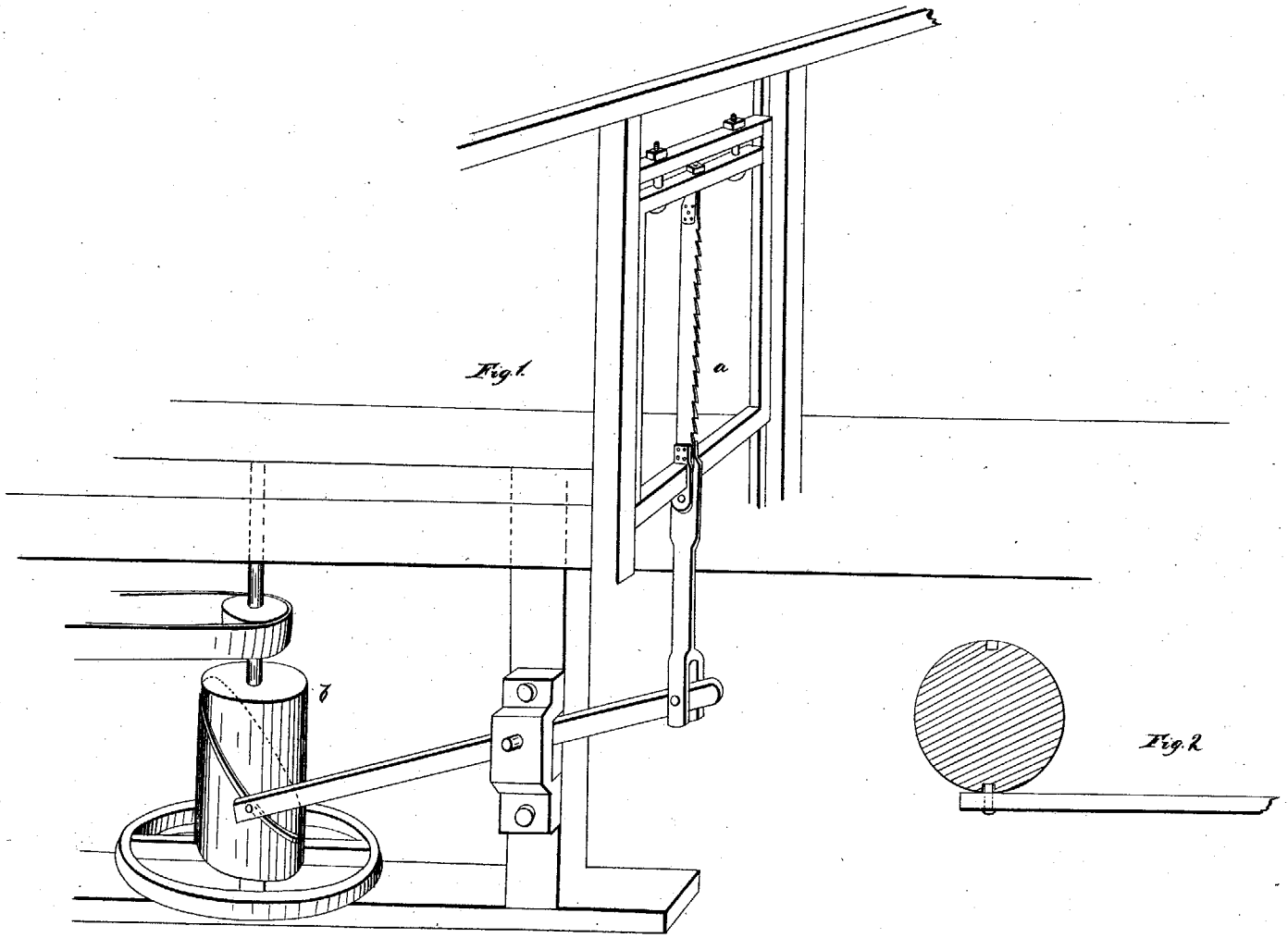
AM. PHOTO-LITHO. CO. N.Y. (OSBORNE'S PROCESS.)

[illegible] Dec 26, 1810 457

1407 Y Ezekiel Olds & Pliny Upham.

Letters Patent.

The Schedule referred to in these Letters Patent and making
part of the same, containing a description in the words of the said
Ezekiel Olds & Pliny Upham themselves of an improvement in a
sawing Machine invented by them and patented the twenty first day
of December one thousand eight hundred and nine.

This improvement consists in the application of the moving prin-
ciple of the Machine above mentioned, to the sawing or slitting of logs
&c. into boards, planks or scantling and is effected in the following man-
ner. The saw with its moveable frame, and other immediate ap-
pendages may be such as in the common Saw Mill, or in any other
way which fancy may dictate. But in this case, instead of
moving the saw frame and saw by a crank, as in the common mode
the action and reaction of the saw, are produced by a lever, or levers
the opposite extremity runs in the zigzag groove of a cylinder, such as
specified in the schedule of the Patent above mentioned; except that
the said grooved cylinder is in this improvement shifted from an
horizontal to a vertical position. a crank and fly wheel may also be
added or not at the option of the constructor.

Witnesses
Liberty Bannister
Cellina Jones

Ezekiel Olds
Pliny Upham

E.O.
P.U.

260 Words